(12) United States Patent
Kang et al.

(10) Patent No.: US 7,187,323 B2
(45) Date of Patent: Mar. 6, 2007

(54) APPARATUS FOR CONTROLLING ANTENNA IN STRATOSPHERIC PLATFORM AND STRATOSPHERIC PLATFORM SYSTEM HAVING THE SAME

(75) Inventors: Byung-Su Kang, Daejon (KR); Yang-Su Kim, Daejon (KR); Bon-Jun Ku, Daejon (KR); Do-Seob Ahn, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 32 days.

(21) Appl. No.: 11/215,326

(22) Filed: Aug. 30, 2005

(65) Prior Publication Data

US 2006/0114149 A1 Jun. 1, 2006

(30) Foreign Application Priority Data

Nov. 30, 2004 (KR) ...................... 10-2004-0099469

(51) Int. Cl.
*H01Q 3/00* (2006.01)
(52) U.S. Cl. .................... 342/359; 342/74; 342/357.11
(58) Field of Classification Search .................. 342/74, 342/354, 357.03, 357.06, 357.11, 359, 372; 701/213, 215; 343/754, 757
See application file for complete search history.

(56) References Cited

U.S. PATENT DOCUMENTS 6,567,052 B1 5/2003 Wang et al.

2002/0067311 A1* 6/2002 Wildey et al. ............. 342/372
2006/0022089 A1* 2/2006 Lloyd ...................... 244/129.1

FOREIGN PATENT DOCUMENTS

| JP | 2002-223110 | 8/2002 |
| KR | 10-2004 0010247 | 1/2004 |

* cited by examiner

*Primary Examiner*—Dao Phan
(74) *Attorney, Agent, or Firm*—Ladas & Parry LLP

(57) ABSTRACT

Provided is an antenna control apparatus for controlling an antenna mounted on a stratospheric platform of the stratospheric communication system. The apparatus includes a plurality of location signal receivers, each receiver being positioned at each of predefined different points of the stratospheric platform and receiving a location signal for the stratospheric platform, a calculating circuit for calculating an adjustable displacement for the antenna, and an antenna driver for adjusting a direction of the antenna. The calculating circuit calculates a location and attitude of the stratospheric platform based on the location signals, and then computes the adjustable displacement using the location and attitude information. This invention can reduce power consumption in the stratospheric platform and recovery time of directional point of the beam.

12 Claims, 2 Drawing Sheets

_US 7,187,323 B2_

APPARATUS FOR CONTROLLING ANTENNA IN STRATOSPHERIC PLATFORM AND STRATOSPHERIC PLATFORM SYSTEM HAVING THE SAME

FIELD OF THE INVENTION

The present invention relates to a stratospheric communication system; and more particularly, to an apparatus for controlling an antenna mounted on a stratospheric platform of the stratospheric communication system.

DESCRIPTION OF RELATED ART

A stratospheric communication system staying at a definite point of an altitude of 20-50 km from the ground is known as an infrastructure that provides various communications and broadcasting services.

In this stratospheric communication system, a location and attitude of a stratospheric platform involved therein is varied due to a change of atmospheric environment or a control error of the platform. Moreover, under a specific circumstance, there may be an instance that allows the location of the stratospheric platform to be moved artificially, according to an instruction of a control station located on the ground.

For these reasons, if the location and attitude of the stratospheric platform is varied, the ground coverage area within which the stratosphere communication system services is also changed. Thus, to stably provide the services by the stratosphere communication system when the location and attitude of the stratospheric platform is varied by a change of the external environment factors, a stable coverage area must be guaranteed by coping with such variations appropriately.

Japanese Laid-open Publication No. 5-227069 presents a scheme, which stays a platform of flying fan shape at the stratosphere of the height of about 20 km from the Earth's surface, and relays communications between a transceiver arranged on the Earth's surface and a transceiver on the communication satellite using such stratospheric platform. According to this scheme, it amplitudes and relays a millimetric wave or more frequency necessary for the high speed broadband communication, which is attenuated by, particularly atmospheric conditions such as rainfall or cloud, etc., using the transceiver in the stratospheric platform.

Further, U.S. Pat. No. 6,567,052 discloses a method that maintains the coverage area when the platform is moved, to avoid interference with other wireless communication systems upon the composition of communication systems using the stratospheric platform.

However, when the location and attitude of the stratospheric platform is varied by a change of the outside environment factors, the above-mentioned prior arts present no solutions that offer a stable service by coping with such variations properly.

SUMMARY OF THE INVENTION

It is, therefore, a primary object of the present invention to provide an apparatus that is capable of guaranteeing a stable coverage area in a stratospheric communication system by properly controlling a location of an antenna involved therein. This can be accomplished by solving, through the efficient control of the antenna, the ground coverage area movement problem by a change of a location and attitude of a stratospheric platform due to atmospheric conditions that inevitably occur under the characteristic of the stratospheric communication system that provide the broadcasting and communication services while making the platform stayed at the stratosphere for a long time, using the location information of the platform.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

In accordance with one aspect of the present invention, there is provided an apparatus for controlling an antenna mounted on a stratospheric platform used in a stratospheric communication system, comprising: a plurality of location signal receivers, each receiver being positioned at each of predefined different points of the stratospheric platform and receiving a location signal for the stratospheric platform; means for calculating an adjustable displacement for the antenna using the location signals; and an antenna driver for adjusting a direction of the antenna in accordance with the adjustable displacement. The calculating means calculates a location and attitude of the stratospheric platform based on the location signals, and then computes the adjustable displacement using the location and attitude information.

Preferably, the calculating means includes a first calculator for calculating, based on a location signal at a first point of time t1 and a location signal at a second point of time t2, the location and attitude of the stratospheric platform at each of the points of time, and a second calculator for computing the adjustable displacement from the location and attitude information at said each point of time.

Further, it may be preferable to design in such a way that the location signal receivers are mounted on the front, back, left, and right sides of the stratospheric platform, respectively, each of which is a global positioning system (GPS) or differential GPS (DGPS).

In accordance with another aspect of the present invention, there is provided a stratospheric platform system used in a stratospheric communication system, comprising: a platform; an antenna located at the lower end of the platform; and an antenna control apparatus for controlling the antenna, wherein the antenna control apparatus includes: a plurality of location signal receivers, each receiver being positioned at each of predefined different points of the platform and receiving a location signal for the platform; means for calculating an adjustable displacement for the antenna using the location signals; and an antenna driver for adjusting a direction of the antenna in accordance with the adjustable displacement.

Hereinafter, the preferred embodiments of the present invention will be explained in detail with reference to the accompanying drawings.

Figure 1:
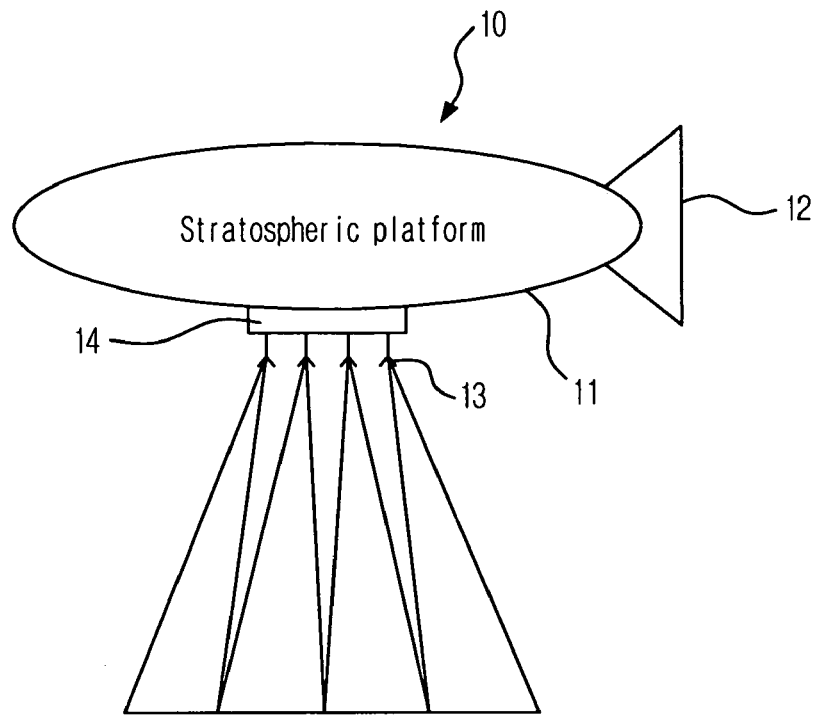
FIG. 1 is a schematic diagram of a stratospheric communication system to which the present invention is applied.

FIG. 1 illustrates a schematic diagram of a stratospheric communication system to which the present invention is applied. A stratospheric platform 10 involved in the stratospheric communication system is a large size flying object staying in the air by its own buoyancy, which comprises a body 11 and a propelling device 12. The body 11 of the platform is over a range of 100–200 m in length and is more than 50 m in width. The location movement of the stratospheric platform 10 is done by the propelling device 12 using a propeller. An antenna 13 for communication is located at the lower end of the platform body 11, and fixed to a mount 14 for supporting the antenna 13. The antenna 13 for communication may be configured by one or more reflecting plates, depending upon the capacity, area, and type of services.

Figure 2:
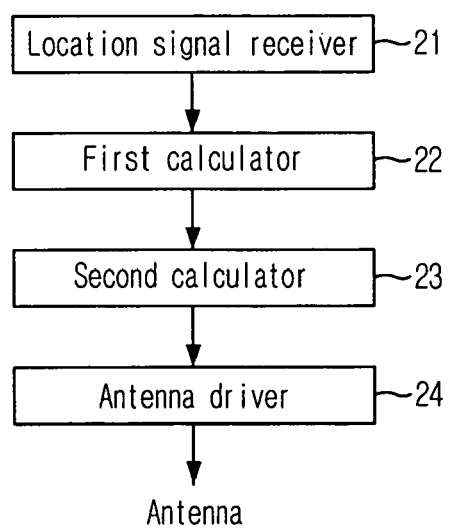
FIG. 2 is a block diagram illustrating a configuration of an antenna control apparatus of a stratospheric platform system in accordance with the present invention.

FIG. 2 illustrates a block diagram showing a structure of an antenna control apparatus of the stratospheric platform system in accordance with a preferred embodiment of the present invention. The antenna control apparatus of the invention comprises a location signal receiver 21, a first and a second calculators 22 and 23, and an antenna driver 24.

Specifically, the location signal receiver 21 is adhered to the body 11 of the stratospheric platform system 10. Shown in FIG. 3 indicates a location of the location signal receiver 21 when an observer has observed the stratospheric platform 10 at the upper end for deriving a location and attitude of the platform 10. A global positioning system (GPS) or differential GPS (DGPS) may be used as the location signal receiver 10, in accordance with the precision required in the services. The GPS receiver currently used has an error of the range of dozens of meter, while the DGPS has an error within 1 m.

Figure 3:
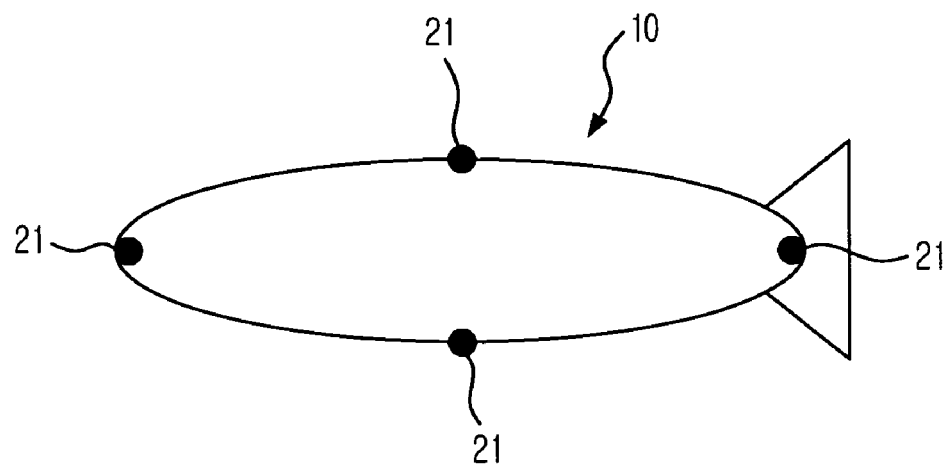
FIG. 3 is a diagram showing a location of a GPS receiver mounted on the stratospheric platform system in accordance with one embodiment of the present invention.

According to FIG. 3, four location signal receivers 21 are adhered to the front, back, left, and right sides on the central horizontal plane of the platform body 11, respectively, for illustration purposes. To precisely derive the location and attitude of the stratospheric platform 10, it may need to have at least three location signal receivers 21.

On the other hand, the first calculator 22 computes the location and attitude of the stratospheric platform 10 by utilizing more than three location signals provided by the location signal receivers 21 at a point of time t1. After passing a certain time, the first calculator 22 again computes the location and attitude of the stratospheric platform 10 using three or more location signals from the location signal receivers 21 at a point of time t2.

The second calculator 23 computes an adjustable displacement of the antenna by using the location and attitude information of the stratospheric platform 10 computed by the first calculator 22. Once the location and attitude of the stratospheric platform 10 has been decided, a spatial coordinate, i.e., the location of the antenna at each of the points of time t1 and t2 can be derived precisely because the antenna is located at a specific part of the stratospheric platform 10. Hence, the adjustable displacement of the antenna can be computed from the location information change of the antenna. It should be noted that one skilled in the art can readily understand that the first and the second calculators 22 and 23 may be unified and configured by one device.

Figure 4:
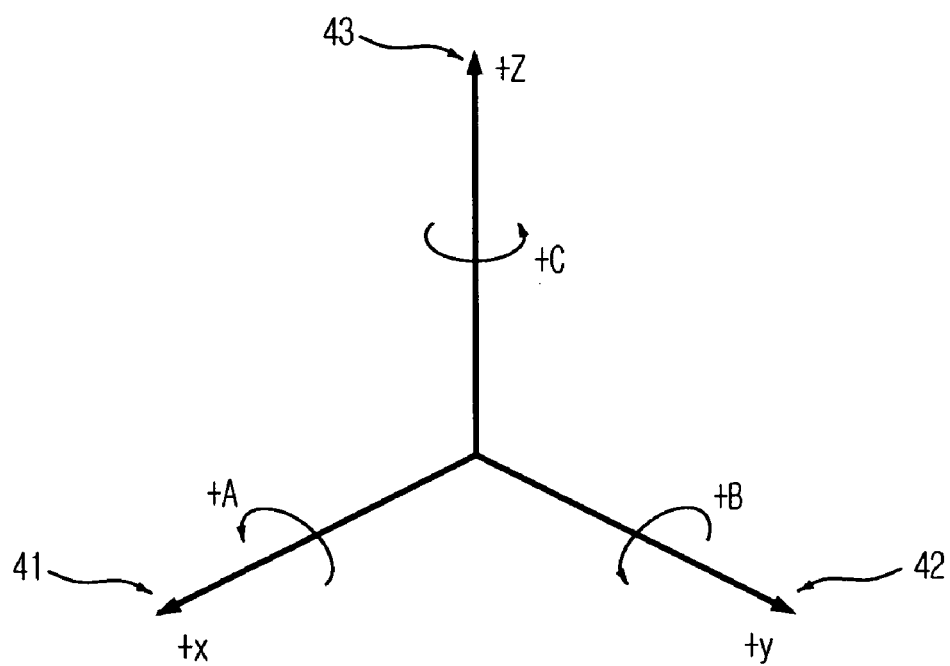
FIG. 4 is a diagram for explaining a three-axis control on an antenna in accordance with one embodiment of the present invention.

Referring again to FIG. 2, the antenna deriver 24 adjusts the location to which the antenna radiation object directs, by using the adjustable displacement of the antenna derived by the second calculator 23. This antenna deriver 24 may be configured to do a three-axis control. As shown in FIG. 4, having arranged the three axes that are rotatable in the directions of A, B, and C with respect to each of x axis 41, y axis 42, and z axis 43, beams can be directed to a desired direction.

As described above, the present invention can reduce the quantity of electric power required in the stratospheric platform and also reduce the recovery time of directional point of the beams, by making the antenna to direct to a specific point on the Earth by means of only the adjustment of the driving device adhered to the antenna without a movement or adjustment of the stratospheric platform itself when the location and attitude of the stratospheric platform is unexpectedly varied by the atmospheric conditions such as wind, air stream, etc.

The present application contains subject matter related to Korean patent application No. 2004-0099469, filed with the Korean Intellectual Property Office on Nov. 30, 2004, the entire contents of which is incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An apparatus for controlling an antenna mounted on a stratospheric platform used in a stratospheric communication system, comprising:

a plurality of location signal receivers, each receiver being positioned at each of predefined different points of the stratospheric platform and receiving a location signal for the stratospheric platform;

means for calculating an adjustable displacement for the antenna using the location signals; and an antenna driver for adjusting a direction of the antenna in accordance with the adjustable displacement.

2. The apparatus as recited in claim 1, wherein the calculating means includes:

a first calculator for calculating a location and attitude of the stratospheric platform based on the location signals; and a second calculator for computing the adjustable displacement using the location and attitude information.

3. The apparatus as recited in claim 2, wherein the first calculator calculates, based on a location signal at a first point of time t1 and a location signal at a second point of time t2, the location and attitude of the stratospheric platform at each of the points of time, and the second calculator computes the adjustable displacement from the location and attitude information at said each point of time.

4. The apparatus as recited in claim 1, wherein the location signal receivers are mounted on the front, back, left, and right sides of the stratospheric platform, respectively.

5. The apparatus as recited in claim 1, wherein the antenna driver is a three-axis controller.

6. The apparatus as recited in claim 1, wherein each of the location signal receivers is a global positioning system (GPS) or differential GPS (DGPS).

7. A stratospheric platform system used in a stratospheric communication system, comprising:

a platform;

an antenna located at the lower end of the platform; and an antenna control apparatus for controlling the antenna, wherein the antenna control apparatus includes:

a plurality of location signal receivers, each receiver being positioned at each of predefined different points of the platform and receiving a location signal for the platform;

means for calculating an adjustable displacement for the antenna using the location signals; and an antenna driver for adjusting a direction of the antenna in accordance with the adjustable displacement.

8. The stratospheric platform system as recited in claim 7, wherein the calculating means includes:

a first calculator for calculating a location and attitude of the platform based on the location signals; and a second calculator for computing the adjustable displacement using the location and attitude information.

9. The stratospheric platform system as recited in claim 8, wherein the first calculator calculates, based on a location signal at a first point of time t1 and a location signal at a second point of time t2, the location and attitude of the platform at each point of time, and the second calculator computes the adjustable displacement from the location and attitude information at said each point of time.

10. The stratospheric platform system as recited in claim 7, wherein the location signal receivers are mounted on the front, back, left, and right sides of the platform, respectively.

11. The stratospheric platform system as recited in claim 7, wherein the antenna driver is a three-axis controller.

12. The stratospheric platform system as recited in claim 7, wherein each of the location signal receivers is a global positioning system (GPS) or differential GPS (DGPS).

* * * * *